(12) United States Patent
Bice et al.

(10) Patent No.: US 9,244,956 B2
(45) Date of Patent: Jan. 26, 2016

(54) RECOMMENDING DATA ENRICHMENTS

(75) Inventors: Anthony Nino Bice, Seattle, WA (US);
David Michael Robinson, Snohomish, WA (US); Hariharan Sivaramakrishnan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 755 days.

(21) Appl. No.: 13/159,654

(22) Filed: Jun. 14, 2011

(65) Prior Publication Data
US 2012/0323843 A1 Dec. 20, 2012

(51) Int. Cl.
*G06F 7/00* (2006.01)
*G06F 17/00* (2006.01)
*G06F 17/30* (2006.01)

(52) U.S. Cl.
CPC .... *G06F 17/30303* (2013.01); *G06F 17/30699* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 5,615,264 A | 3/1997 | Kazmierczak et al. | |
| 5,649,181 A * | 7/1997 | French et al. | 395/603 |
| 5,960,194 A * | 9/1999 | Choy et al. | 395/613 |
| 6,226,623 B1 * | 5/2001 | Schein et al. | 705/35 |
| 6,556,986 B2 * | 4/2003 | Hara et al. | 707/2 |
| 7,124,101 B1 | 10/2006 | Mikurak | |
| 7,233,939 B1 * | 6/2007 | Ziauddin | 707/718 |
| 7,571,069 B1 | 8/2009 | Farkas et al. | |
| 7,571,191 B2 | 8/2009 | Dill et al. | |
| 7,647,349 B2 | 1/2010 | Hubert et al. | |
| 7,668,821 B1 | 2/2010 | Donsbach et al. | |
| 7,849,016 B2 | 12/2010 | So | |
| 7,984,056 B1 * | 7/2011 | Kane | 707/749 |
| 8,122,031 B1 * | 2/2012 | Mauro et al. | 707/748 |
| 8,812,490 B1 * | 8/2014 | Cappiello et al. | G06F 7/00 707/714 |
| 2004/0148278 A1 | 7/2004 | Milo et al. | |
| 2006/0129599 A1 | 6/2006 | Hammerich | |
| 2008/0059454 A1 | 3/2008 | Andrieu | |
| 2008/0082565 A1 * | 4/2008 | Chang et al. | 707/102 |
| 2008/0104542 A1 | 5/2008 | Cohen et al. | |

(Continued)

FOREIGN PATENT DOCUMENTS

KR 1020110047703 A 5/2011

OTHER PUBLICATIONS

"Securing Data at Rest: Developing a Database Encryption Strategy", Retrieved at <<http://www.rsa.com/products/bsafe/whitepapers/DDES_WP_0702.pdf>>, Retrieved Date: Apr. 7, 2011, pp. 15.

(Continued)

*Primary Examiner* — James Trujillo
*Assistant Examiner* — Cheryl M Shechtman
(74) *Attorney, Agent, or Firm* — Nicholas Chen; Kate Drakos; Micky Minhas

(57) ABSTRACT

The present invention extends to methods, systems, and computer program products for recommending data sources. A request to provide recommendations of data enrichments for a database is received at a recommendation engine. The recommendation engine may perform static and dynamic analysis of data associated with the database and may further refine recommendations based on policies. The recommendation engine may then provide the recommendations, if any, of data enrichments to allow a software developer, for example, to indicate whether the data enrichments are to be used.

20 Claims, 4 Drawing Sheets

(56) References Cited

U.S. PATENT DOCUMENTS

| | | |
|---|---|---|
| 2008/0222132 A1 | 9/2008 | Pan et al. |
| 2008/0235288 A1 | 9/2008 | Ben Harush |
| 2010/0042460 A1 | 2/2010 | Kane, Jr. |
| 2010/0250533 A1 | 9/2010 | Agro et al. |
| 2010/0293048 A1 | 11/2010 | Singolda et al. |
| 2012/0159528 A1* | 6/2012 | Toney, Jr. .................. 725/14 |

OTHER PUBLICATIONS

Damiani, et al., "Metadata Management in Outsourced Encrypted Databases", Retrieved at <<http://spdp.dti.unimi.it/papers/sdm05.pdf>>, In Proceedings of the 2nd VLDB Workshop on Secure Data Management, Sep. 2005, pp. 1-17.

Sion, Radu., "Towards Secure Data Outsourcing", Retrieved at <<http://citeseerx.ist.psu.edu/viewdoc/download?doi=10.1.1.86.8594&rep=rep1&type=pdf>>, Retrieved Date: Apr. 7, 2011, pp. 23.

Yu, et al., "Achieving Secure, Scalable, and Fine-grained Data Access Control in Cloud Computing", Retrieved at <<http://www.chennaisunday.com/ieee 2010/Achieving Secure, Scalable, and Fine-grained Data Access Control in Cloud Computing.pdf>>, Proceedings of IEEE INFOCOM, Mar. 14-19, 2010, pp. 9.

"Database Encryption in Oracle9i", Retrieved at <<http://www.cgisecurity.com/database/oracle/pdf/f5crypt.pdf>>, Feb. 2001, pp. 12.

Farmer, Donald., "Deliver Rich Analytics with Analysis Services SQL Server", Retrieved at <<http://download.microsoft.com/download/3/2/F/32F05B83-DEE7-4076-A703-CD671A4DF0A9/AnalysisServices.ppt>>, Retrieved Date: Apr. 5, 2011, pp. 5.

"Windows Azure Marketplace DataMarket", Retrieved at <<http://www.microsoft.com/windowsazure/Whitepapers/DataMarket/default.aspx>>, Oct. 2010, pp. 9.

"Data Cleansing & Enrichment", Retrieved at <<http://www.sas.com/software/data-management/entdiserver/data-quality.html>>, Retrieved Date: Apr. 7, 2011, p. 1.

Comerio, et al., "Service-oriented Data Quality Engineering and Data Publishing in the Cloud", Retrieved at <<http://www.infosys.tuwien.ac.at/staff/truong/publications/2010/truong-soca10-short.pdf>>, IEEE International Conference on Service-Oriented Computing and Applications (SOCA), Dec. 13-15, 2010, pp. 6.

Mahmoudi, et al., "SDET: A Semantic Data Enrichment Tool Application to Geographical Databases", Retrieved at <<http://www2.u-bourgogne.fr/SITIS/06/Proceedings/IMRT/f27.pdf>>, 2006, pp. 88-97.

"Oracle Product Data Quality", Retrieved at <<http://www.oracle.com/partners/en/most-popular-resources/059010.html>>, Retrieved Date: Apr. 7, 2011, pp. 6.

Rotard, et al., "Semantic Lenses: Seamless Augmentation of Web Pages with Context Information from Implicit Queries", Retrieved at <<http://www.vis.uni-stuttgart.de~giereth/publications/CG06-rotard.pdf>>, In Proceedings of Computers & Graphics, vol. 31, No. 3, Dec. 22, 2006, pp. 1-11.

"International Search Report", Mailed Date: Jan. 31, 2013, Application No. PCT/US2012/040950, Filed Date: Jun. 5, 2012, pp. 10.

Farmer, Donald, "Deliver Rich Analytics with Analysis Services SQL Server", Retrieved at <<http://download.microsoft.com/download/3/2/F/32F05B83-DEE7-4076-A703-CD671A4DF0A9/AnalysisServices.ppt>>, Retrieved Date: Apr. 5, 2011, pp. 5.

* cited by examiner

RECOMMENDING DATA ENRICHMENTS

CROSS REFERENCE TO RELATED APPLICATIONS

This application is related to U.S. patent application Ser. No. 13/159,666, entitled "ENRICHING DATABASE QUERY RESPONSES USING DATA FROM EXTERNAL DATA SOURCES," and to U.S. patent application Ser. No. 13/159,658, entitled "DATA CUSTODIAN AND CURATION SYSTEM".

BACKGROUND

Databases are a common commodity in today's business. Even very simple business software applications will often include the use of a database. As the use of databases has grown, data sources that provide data that augments data found in business and other databases has also grown. For example, a software developer may create a software application that accesses a database to determine addresses. Several data sources on the Internet are available that generate a map that includes directions for going to a destination. As another example, there are several sites on the Internet that provide weather information. Indeed, there are so many data sources available, that it is challenging for software developers to discover and use these data sources.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to recommending data sources. In aspects, a request to provide recommendations of data enrichments for a database is received at a recommendation engine. The recommendation engine may perform static and dynamic analysis of data associated with the database and may further refine recommendations based on policies. The recommendation engine may then provide the recommendations, if any, of data enrichments to allow a software developer, for example, to indicate whether the data enrichments are to be used.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
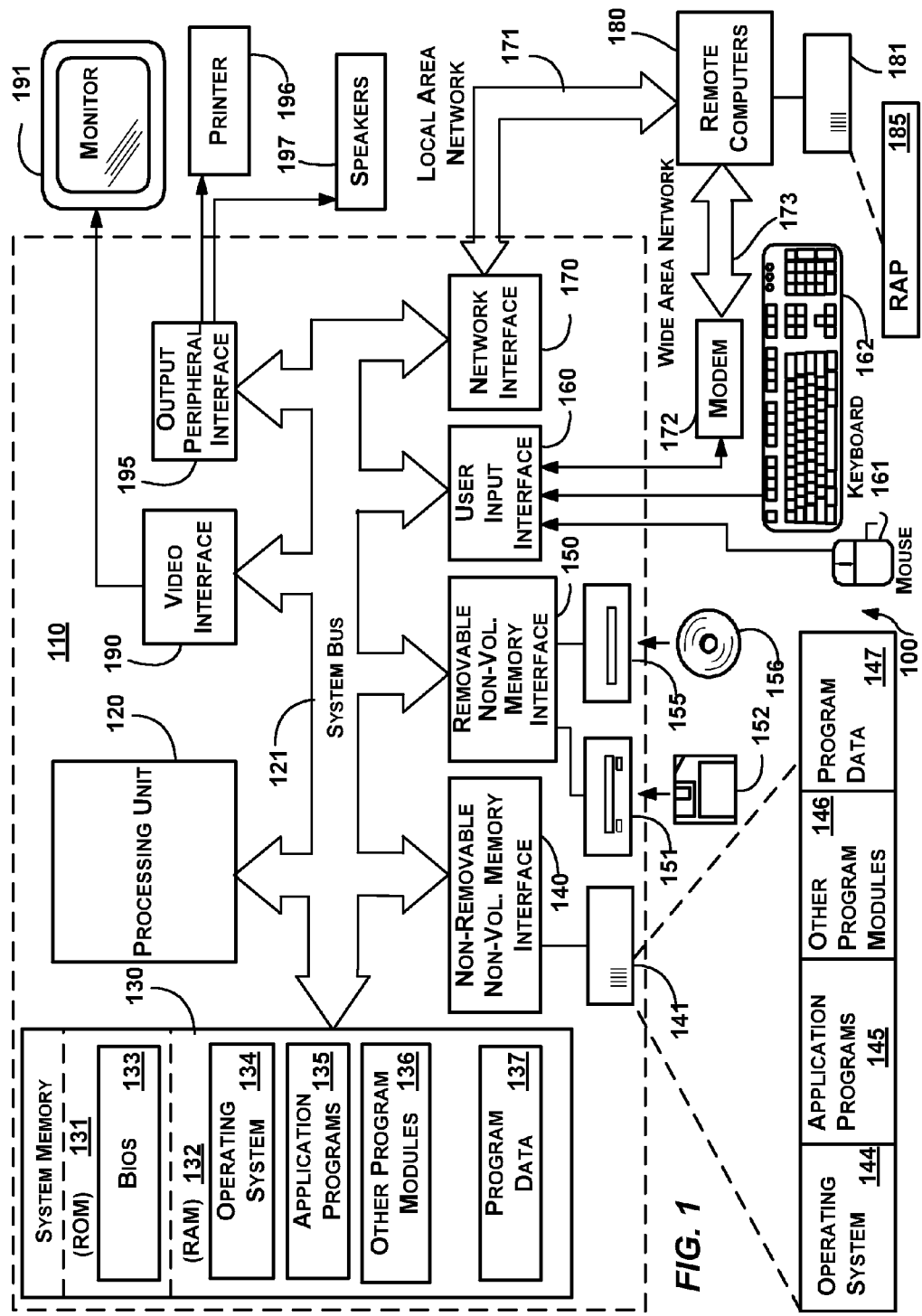
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Data Enrichments

Figure 2:
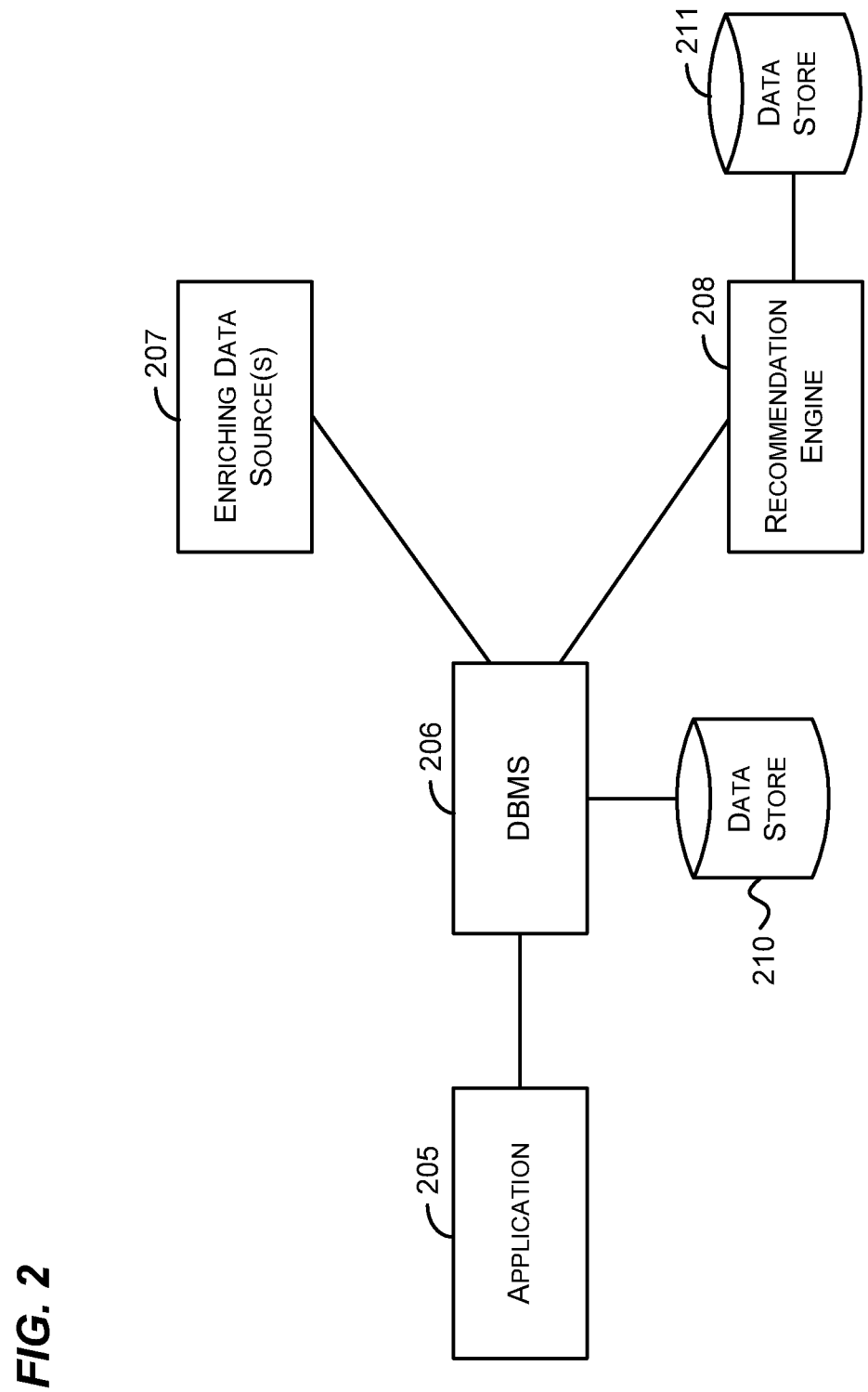
FIG. 2 is a block diagram that represents an exemplary environment in which aspects of the subject matter described herein may be implemented.

As mentioned previously, it is challenging for software developers to discover and use augmenting data sources. FIG. 2 is a block diagram that represents an exemplary environment in which aspects of the subject matter described herein may be implemented. The components illustrated in FIG. 2 are exemplary and are not meant to be all-inclusive of components that may be needed or included. In other embodiments, the components described in conjunction with FIG. 2 may be included in other components (shown or not shown) or placed in subcomponents without departing from the spirit or scope of aspects of the subject matter described herein.

As used herein, the term component is to be read to include hardware such as all or a portion of a device, a collection of one or more software modules or portions thereof, some combination of one or more software modules or portions thereof and one or more devices or portions thereof, and the like.

Turning to FIG. 2, the environment may include an application 205, a database management system (DMBS) 206, enriching data source(s) 207, a recommendation engine 208, data stores 210 and 211, and other components (not shown).

The various components may be located relatively close to each other (e.g., on the same machine or on machines on the same network) or may be distributed across the world. The various components may communicate with each other via various networks including intra- and inter-office networks.

The application 205, the DBMS 206, the enriching data source(s) 207, and the recommendation engine 208 may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

The application 205 may include a process that is capable of communicating with one or more of the other entities of FIG. 2. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Likewise, the application 205 may have components that are distributed over one or more devices.

In one embodiment, the application 205 may include a software development tool. The software development tool may implement an integrated development environment (IDE) that allows a software developer to enter and update code, debug code, create and update databases, associate the code with one or more databases, compile the code, create a package, do other actions, and the like.

Data in a data store 210 may be accessed via the DBMS 206. A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like.

A database stored on the data store 210 may comprise a relational database, object-oriented database, hierarchical database, network database, other types of database, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

The enriching data source(s) 207 may include any entity that is capable of supplying data. For example, the enriching data source(s) 207 may include a service that receives data (e.g., a zip code) and provides data (e.g., weather information) in response thereto. As another example, the enriching data source(s) 207 may include a service that provides real or delayed stock prices. Each enriching data source may be implemented via a process executed by one or more computers.

A database stored on the data store 210 may be enriched by the enriching data source(s) 207. The DBMS 206 may obtain data from the enriching data source(s) 207 and make the data appear (e.g., to the application 205) as if it comes from a database managed by the DBMS 206. The data obtainable from the enriching data source(s) 207 is sometimes referred to herein as data enrichments. For example, the DBMS 206 may use zip code information found in the database to obtain weather information from an enriching data source. The weather information may be accessible via one or more columns of a table exposed by the DBMS 206.

The DBMS 206 may store information that indicates the data enrichments that are to be provided with the database of the data store 210. In providing data from the database, the DBMS 206 may also make available the data enrichments.

In one embodiment, the recommendation engine 208 may provide recommendations of data enrichments to the DBMS 206 which may then provide these recommendations to the application 205. In another embodiment, the recommendations engine 208 may provide recommendations of data enrichments directly to the application 205. A recommendation may include a name or other identifier of a recommendation, an input data type needed by the data enrichment associated with the recommendation, and an output data type provided by the data enrichment.

The recommendation engine 208 may determine these recommendations in a variety of ways. Some of these ways include, for example:

1. Dynamic analysis. The DBMS 206 may collect statistical information about queries that are executed by the DBMS 206. This information may be provided to the recommendation engine 208 which may use the information to suggest new enrichments and data sources. For example, if a query uses a COMPANYFINANCIAL enrichment, the recommendation engine 208 may recommend a COMPANYNEWS enrichment as well. This recommendation may be provided because both enrichments use company name as input.

To determine an enrichment using dynamic analysis, the recommendation engine 208 may use a data structure that maps between enrichments. For example, the recommendation engine 208 may maintain or be provided with a table that includes rows where each row includes a field of a first enrichment and a second enrichment. The second enrichment is the data enrichment that is to be recommended based on the first enrichment. By the use of zero or more rows, this table may be used to map a first enrichment to zero or more other enrichments that may be recommended based on the first enrichment.

Statistics such as query time may be used to recommend data sources that are indexed differently from the data source that is currently being used. For example, a stock ticker data source may be able to provide up-to-date stock prices using a company name or a stock symbol (e.g., MSFT). When a company name is provided, the stock ticker data source may need to look up a stock symbol by which the company is known to the stock market. The data source may then use this stock symbol to obtain the ticker data.

Rather than use the above methodology to obtain ticker data, a data source that receives the stock symbol may just obtain the ticker data directly and thus be able to obtain the data faster than a data source that has to translate from the company name to a ticker name. If a company table has a stock symbol field but is using a company name data enrichment to get ticker data, the recommendation engine 208 may recommend that the data enrichment that uses the stock symbol field be used instead. Alternatively, the recommendation engine 208 may recommend a stock symbol entity that includes the stock symbol for each company of the company table and may then recommend enrichments based on the stock symbol entity.

2. Static analysis. Data that is stored in a database has structural metadata regarding database objects that include tables, columns, procedures, extensible markup language (XML), and the like. This structural metadata may be examined to determine the kind of data that is stored and processed by the database. Some examples of structural metadata include table names, column names, stored procedure names, column data types, other object names, and the like.

For example, a table named company may indicate that the table has company information. Within the table named company, a column named name may indicate the name of the company. This metadata may be used to determine that the name column within the company table is the name of a company. This may then be used to provide enrichment recommendations for companies such as a COMPANYFINANCIAL enrichment, a COMPANYNEWS enrichment, a COMPANYSOCIALNETWORKS enrichment, and other company enrichments.

To facilitate determining data enrichments for static analysis, a data structure may be used that maps from an identifier (e.g., a name) to one or more enrichments associated with the name. For example, the recommendation engine 208 may maintain or be provided with a table that includes rows where each row includes one or more fields of metadata attribute(s) (e.g., table name, column, name, data type) and a data enrichment that is to be recommended based on the metadata attribute(s). By the use of zero or more rows, this table may be used to map a metadata attribute(s) to zero or more other enrichments that may be recommended based on the metadata attributes.

As an example of a data enrichment that may be recommended based on a column data type, the metadata may indicate that a column uses a GEOMETRY data type. In response, the recommendation engine 208 may recommend a LOCATION entity and enrichments that are associated with the LOCATION entity (e.g., weather, crime rate, population density, demographics, housing statistics, and the like).

Column data type may also be determined by examining the data in the database itself. For example, by examining columns in a table, the recommendation engine 208 may be able to determine that the columns represent an address. This may be done, for example, by attempting to look up an address using the data in the columns. Once the recommendation engine 208 determines that the columns represent an address, the recommendation engine 208 may use the mapping techniques mentioned herein to recommend data enrichment(s) based on the address.

Similarly, static analysis of data within the database may be able to yield additional information regarding data contained within the database. This information may also be used to recommend data enrichments.

3. Policy. Recommendations may be made based on policies. These policies may be defined by the application 205 or otherwise. A policy may be thought of as a rule that has one or more conditions that constrain a recommendation based on evaluating the condition(s). For example, a policy may be based on transaction cost, a data source rating, a service license agreement (SLA), whether the data is allowed to be persisted in database, or other conditions. For example, a policy may indicate that as long as the price for the data enrichment is less than a certain amount, a recommendation for the data enrichment is allowed.

4. A directory. The available data enrichments may be searchable. For example, the recommendation engine 208 may provide a list of data enrichments and their corresponding data sources in a table that a software developer or the like may query. The table may indicate the type of data accepted as input and produced as output. The table may also include licensing restrictions, costs (if any), other data about the data enrichments, and the like.

The data store 211 is a store that stores data used for recommendations. The data may include, for example, mapping data, a directory of available data enrichments, pricing, performance, and reliability data, license agreements regarding data sources, and the like.

The data stores 210-211 may be implemented using any storage media capable of storing data. A store may include volatile memory (e.g., a cache) and non-volatile memory (e.g., a persistent storage). A store may be implemented using a file system, database, volatile memory such as RAM, other storage, some combination of the above, and the like and may be distributed across multiple devices.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like.

Figure 3:
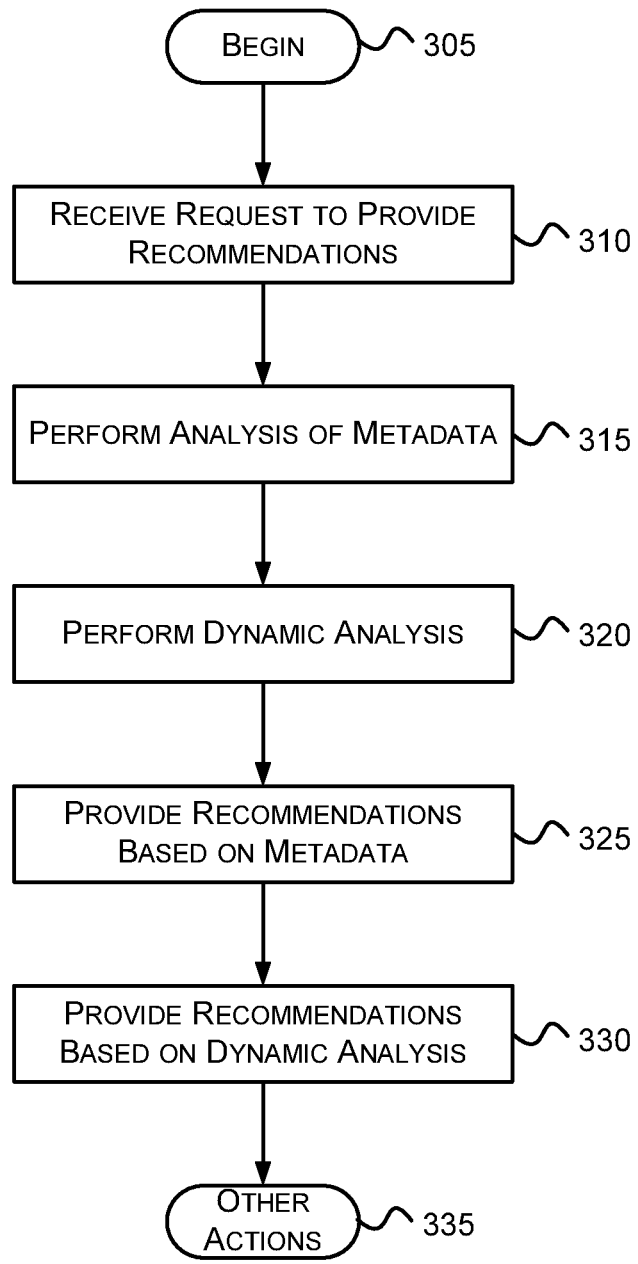
FIGS. 3-4 are flow diagrams that generally represent exemplary actions that may occur in accordance with aspects of the subject matter described herein.
Figure 4:
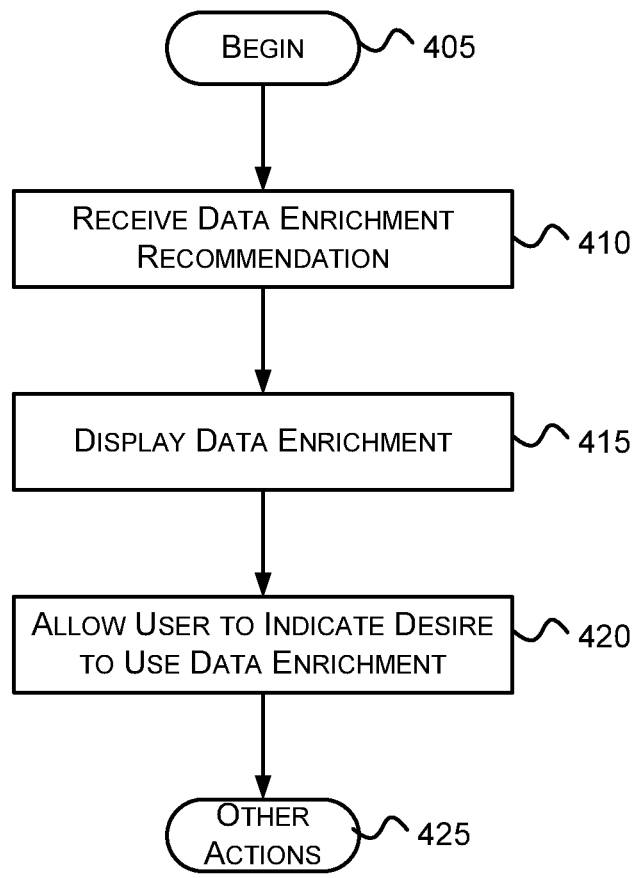

FIGS. 3-4 are flow diagrams that generally represent exemplary actions that may occur in accordance with aspects of the subject matter described herein. For simplicity of explanation, the methodology described in conjunction with FIGS. 3-4 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 3, at block 305, the actions begin. At block 310, a request is received to provide recommendations of data enrichments for a database. For example, referring to FIG. 2, the application 205, the DBMS 206, or some other component may request that the recommendation engine 208 provide recommendations of data enrichments for a database managed by the DMBS.

At block 315, analysis of metadata may be performed. For example, referring to FIG. 2, the recommendation engine 208 may use metadata about a database supplied by the DBMS 206 together with mapping information on the data store 211 to determine one or more recommendations to provide. In addition, the recommendation engine 208 may evaluate conditions of policies to constrain the recommendations to those that do not violate the policies.

Although in one embodiment, the analysis of metadata may be performed after receiving the request to provide recommendations, in another embodiment, the analysis may be performed prior to receiving the request. In one embodiment, the analysis is an ongoing process that continues to update recommendations as metadata regarding a database changes.

In one implementation, analysis of metadata may include the following exemplary actions:

1. Obtaining metadata associated with the database. This may involve requesting the data from the DBMS, receiving (without requesting) the data from the DBMS, or some other mechanism.

2. Finding an identifier within the metadata. This may involve finding name(s) of one or more tables, columns, stored procedures, or other database objects.

3. Mapping the identifier to a data enrichment using a data structure that associates the identifier with the data enrichment. This may involve using a table or other data structure that includes one or more identifiers as a key to identifying one or more other identifiers. For example, a name "company" of a table or column may be used to find associated enrichments in the data structure. As another example, the name "company" of a table together with the name "stock symbol" of a column of the table may be used together to find associated stock ticker enrichment.

At block 320, dynamic analysis may be performed. For example, referring to FIG. 2, the recommendation engine 208 may analyze one or more queries issued to a database to determine recommendations for data enrichments. For example, if a query indicates one data enrichment, this data enrichment may be used to identify other data enrichments using a mapping data structure of the like. In addition, the recommendation engine 208 may evaluate conditions of policies to constrain the recommendations to those that do not violate the policies.

In one implementation, dynamic analysis may include analyzing queries issued to the database. In this implementation, determining a recommendation may be performed by the following exemplary actions, 1. Obtaining a first identifier of a first data enrichment referenced by the at least one query. For example, if the query includes an identifier (e.g., name) of a data enrichment ("COMPANYFINANCIAL"), the identifier may be obtained.

2. Mapping the first identifier to a second identifier of a second data enrichment using a data structure that associates identifiers of data enrichments.

Other exemplary dynamic analysis may involve the following exemplary actions:

1. Comparing query times of a first query and a second query that obtain an identical type (e.g., stock price) of enrichment data from two different data sources;

2. Selecting a fastest query of the first query and the second query depending on which of the first query and the second query have the smallest latency in obtaining the output data;

3. Determining an identifier of the data enrichment associated with the fastest query.

The data enrichment may then be recommended to improve performance, for example.

Although in one embodiment, the analysis of queries may be performed after receiving the request to provide recommendations, in another embodiment, the analysis may be performed prior to receiving the request. In one embodiment, the analysis is an ongoing process that continues to update recommendations as queries to the database are received.

At block 325, recommendations based on the analysis of the metadata are provided. For example, referring to FIG. 2, the recommendation engine 208 may provide recommendations of data enrichments to the DBMS 206, the application 205, or some other component.

At block 330, recommendations based on dynamic analysis are provided. For example, referring to FIG. 2, the recommendation engine 208 may provide recommendations of data enrichments to the DBMS 206, the application 205, or some other component.

The recommendations based on metadata and the recommendations based on dynamic analysis may be provided together or separately without departing from the spirit or scope of aspects of the subject matter described herein. In some cases, there may only be recommendations based on dynamic analysis. In other cases, there may only be recommendations based on static analysis.

At block 335, other actions, if any, may be performed. Other actions may include, for example, providing a searchable directory that identifies data enrichments and the data enrichments corresponding data sources.

Turning to FIG. 4, at block 405, the actions begin. At block 410, a data enrichment recommendation is received. The recommendation is based on one or more of analysis of metadata of the database and analysis of queries issued to a DBMS that provides access to the database. For example, referring to FIG. 2, the DBMS 206 may receive a recommendation of a COMPANYNEWS enrichment from the recommendation engine 208. Subsequently, the DBMS 206 may provide the recommendation to the application 205. In another embodiment, the application 205 may receive the recommendation directly from the recommendation engine 208.

At block 415, an indication of the recommendation may be provided via a graphical interface. For example, referring to FIG. 2, the application 205 may provide a software developer, user, or the like with an indication of the recommendation by displaying the recommendation on a computer display together with user interface elements that allow the software developer to indicate whether the software developer desires to use the data enrichment.

At block 420, the software developer is allowed to indicate whether the software developer desires to use the data enrichment. For example, referring to FIG. 2, the software developer may indicate to the application 205 whether the recommended data enrichment is to be used via the interface elements displayed. In response, the application 205 may inform the DBMS 206 whether the recommended data enrichment is to be used.

At block 425, other actions, if any, may be performed. For example, instead of receiving a set of recommendations, a directory of data enrichments, their associated data sources, and other information (e.g., cost, speed, reliability, or the like) may be received. This directory or at least a portion of it may be displayed via a graphical interface. A software developer may also issue queries against this directory to find enrichments in which the developer is interested in using.

As another example, a software developer may be able to define (e.g., via a graphical interface) one or more policies that are to be satisfied in conjunction with providing a recommendation. These policies may then be provided to a recommendation engine for use in recommending data enrichments that do not violate the policies.

As can be seen from the foregoing detailed description, aspects have been described related to recommending data enrichments. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. At a computer system, the computer system including a processor, a method for recommending data enrichments for a database, the method comprising the processor:
    receiving a request to provide data enrichment recommendations for the database;
    analyzing metadata for the database, the metadata defining the structure of the database;
    recommending a first data enrichment for the database based on the analysis of the metadata, the first data enrichment to supplement the database;
    suggesting a second data enrichment for the database based on a similarity between the first data enrichment and the second data enrichment, the second data enrichment to supplement the database; and
    identifying a data source capable of providing the second data enrichment by:
        comparing a characteristic of a first query and a second query that obtain enrichment data for the second data enrichment from two different enriching data sources;
        selecting an appropriate query based on the comparison of the characteristic of the first query and the second query; and
        determining an identifier for the enriching data source associated with the appropriate query.

2. The method of claim 1, further comprising identifying a data source capable of providing the first data enrichment by:
    finding an identifier within the metadata; and
    mapping the identifier to the data source using a data structure that associates the identifier with the first data enrichment.

3. The method of claim 2, wherein finding an identifier within the metadata comprises finding a column name within the metadata and wherein mapping the identifier to the first enriching data source comprises using a table that associates identifiers with data enrichments.

4. The method of claim 2, wherein finding an identifier within the metadata comprises finding a table name within the metadata and wherein mapping the identifier to the first enriching data source comprises using a table that associates identifiers with data enrichments.

5. The method of claim 2, wherein finding an identifier within the metadata comprises finding a stored procedure name within the metadata and wherein mapping the identifier to the first enriching data source comprises using a table that associates identifiers with data enrichments.

6. The method of claim 2, wherein finding an identifier within the metadata comprises finding a data type of a column of the database and wherein mapping the identifier to the first enriching data source comprises searching a table that associates data types with data enrichments.

7. The method of claim 1, wherein recommending the first data enrichment comprises sending a name of the first data enrichment as well as an input data type for the first data enrichment and an output data type for the first data enrichment, the name, the input data type, and the output data type for use in developing software to reference data enrichments through the database.

8. The method of claim 1,
    wherein selecting an appropriate query based on the comparison comprises selecting the fastest query depending on which of the first query and the second query have the smallest latency.

9. The method of claim 1, further comprising displaying an indication of the first data enrichment at a graphical interface.

10. The method of claim 1, wherein comparing a characteristic of a first query and a second query that obtain enrichment data for the second data enrichment from two different enriching data sources comprises comparing query times of the first query and the second query; and
    wherein selecting an appropriate query based on the comparison of the characteristic of the first query and the second query comprises selecting the fastest query of the first query and the second query based on comparison of the query times.

11. The method of claim 10, wherein selecting the fastest query of the first query and the second query based on comparison of the query times comprises selecting the fastest query of the first query and the second query depending on which of the first query and the second query have the smallest latency in obtaining enrichment data for the second data enrichment.

12. A system, the system comprising:
    a processor;
    system memory;
    a database storing data and metadata regarding the data, the metadata defining the structure of the database;
    one or more computer storage devices having stored thereon computer-executable instructions representing a recommendation engine, the recommendation engine configured to:
        receive a request to provide data enrichment recommendations for the database;
        analyze the metadata;
        recommend a first data enrichment for the database based on the analysis of the metadata, the first data enrichment to supplement the database;
        suggest a second data enrichment for the database based on a similarity between the first data enrichment and the second data enrichment to supplement the database; and
        identify a data source capable of providing the second data enrichment by:

selecting a fastest query from a first query and a second query that obtain enrichment data for the second data enrichment from different data sources based on query times of the first query and the second query; and determining an identifier for the data source associated with the fastest query.

13. The system of claim 12, wherein the DBMS, the database, and the recommendation engine are hosted on one or more servers located remotely from the software component, and wherein the software component is used by a software developer to augment the database.

14. The system of claim 12, wherein the DBMS, the database, the recommendation engine, and the software component are hosted on a computer, and wherein the software component is an application.

15. The system of claim 12, wherein the recommendation engine being configured to recommend the first data enrichment comprises the recommendation engine being configured to:

find an identifier within the metadata; and map the identifier to the first data enrichment using a data structure that associates the identifier with the first data enrichment.

16. The system of claim 12, wherein the recommendation engine being configured to select a fastest query from a first query and a second query comprises the recommendation engine being configured to select the fastest query depending on which of the first query and the second query have the smallest latency.

17. A computer storage medium having computer-executable instructions, which when executed perform actions, comprising:

receiving a request to provide data enrichment recommendations for the database;

analyzing metadata for the database, the metadata defining the structure of the database;

recommending a first data enrichment for the database based on the analysis of the metadata, the first data enrichment to supplement the database;

suggesting a second data enrichment for the database based on a similarity between the first data enrichment and the second data enrichment to supplement the database; and identifying a data source capable of providing the second data enrichment by:

selecting a query with the fastest query time from among a first query and a second query that access the second enrichment data from different data sources; and determining an identifier for data source associated with the query.

18. The computer storage medium of claim 17, further comprising receiving a data structure that associates recommendations with enriching data sources and displaying at least a portion of the recommendations and their associated enriching data sources via a graphical interface.

19. The computer storage medium of claim 17, further comprising providing one or more policies that are to be satisfied in conjunction with recommending the first data enrichment.

20. The computer storage medium of claim 17, wherein selecting a query with the fastest query time from among a first query and a second query comprises selecting a query with the smallest latency from among the first query and the second query.

* * * * *